United States Patent
Graves et al.

(10) Patent No.: US 7,184,942 B2
(45) Date of Patent: Feb. 27, 2007

(54) VERIFYING THE CONFIGURATION OF A VIRTUAL NETWORK

(75) Inventors: David Andrew Graves, Monte Sereno, CA (US); Brian John O'Keefe, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 687 days.

(21) Appl. No.: 10/444,453

(22) Filed: May 22, 2003

(65) Prior Publication Data

US 2004/0249916 A1    Dec. 9, 2004

(51) Int. Cl.
G06F 9/455    (2006.01)

(52) U.S. Cl. ............ 703/13; 703/21; 709/249; 709/248; 713/2

(58) Field of Classification Search ............ 703/10, 703/13, 21; 709/249, 227, 248, 224, 202, 709/223, 253; 713/2; 370/395.1, 252; 455/411; 726/3
See application file for complete search history.

(56) References Cited

U.S. PATENT DOCUMENTS

| | | | |
|---|---|---|---|
| 6,085,238 A * | 7/2000 | Yuasa et al. ............ 709/223 |
| 6,363,411 B1 * | 3/2002 | Dugan et al. ............ 709/202 |
| 6,971,028 B1 * | 11/2005 | Lyle et al. ............ 726/3 |
| 2003/0105881 A1 * | 6/2003 | Symons et al. ............ 709/249 |
| 2004/0024881 A1 * | 2/2004 | Elving et al. ............ 709/227 |
| 2004/0034702 A1 * | 2/2004 | He ............ 709/224 |
| 2004/0083308 A1 * | 4/2004 | Sebastian et al. ............ 709/248 |
| 2004/0120260 A1 * | 6/2004 | Bernier et al. ............ 370/252 |
| 2004/0123091 A1 * | 6/2004 | Das ............ 713/2 |
| 2004/0148375 A1 * | 7/2004 | Levett et al. ............ 709/223 |
| 2004/0177166 A1 * | 9/2004 | Ellison et al. ............ 709/253 |
| 2004/0203593 A1 * | 10/2004 | Whelan et al. ............ 455/411 |
| 2004/0213258 A1 * | 10/2004 | Ramamoorthy ............ 370/395.1 |
| 2005/0027851 A1 * | 2/2005 | McKeown et al. ............ 709/224 |

* cited by examiner

*Primary Examiner*—Paul Rodriguez
*Assistant Examiner*—K Thangavelu

(57) ABSTRACT

Methods and systems for verifying that a virtual network is properly configured are described. Configuration information from devices in the virtual network is received. The configuration information is compared against reference information. The reference information represents the design of the virtual network. Discrepancies between the configuration of the devices and the design of the virtual network are identified.

22 Claims, 3 Drawing Sheets

VERIFYING THE CONFIGURATION OF A VIRTUAL NETWORK

TECHNICAL FIELD

Embodiments of the present invention relate to virtual networks (e.g., virtual local area networks). More specifically, embodiments of the present invention relate to virtual networks used as utility data centers and server farms, for example.

BACKGROUND ART

Devices such as computer systems, routers, switches, load balancers, firewalls, and the like, are commonly linked to each other in networks. These networks are configured in different ways depending on implementation-specific details such as the hardware used and the physical location of the equipment, and also depending on the particular objectives of the network. One common type of network configuration includes a number of "virtual" networks, commonly known as virtual local area networks (VLANs). A VLAN is, in essence, a logical segmentation of a physical local area network (LAN).

An advantage of VLANs is that the devices associated with a particular virtual network do not need to all be in the same physical location, yet all will appear to be on the same LAN. Prior Art FIG. 1 is a block diagram of a portion of a LAN 10 that includes a number of racks (20, 21 and 22) of computer systems (30–38) and a hierarchy of switches (11–16). Each of the computer systems 30–38 is physically wired to a respective switch (14, 15 or 16), which are each physically wired to switches 12 and 13, which in turn are physically wired to switch 11. By routing signals through the various switches, computer systems in different racks or within the same rack can communicate with each other, within certain constraints that will be explained. In addition, a signal from a remote device (not shown) can also be routed through the various switches so that the remote device can communicate with any of the devices in LAN 10, within certain constraints as well.

In the simplified example of Prior Art FIG. 1, LAN 10 is logically segmented into a VLAN 1 and a VLAN 2. VLAN 1 includes computer systems 30 and 37, and VLAN 2 includes computer systems 31 and 36. Should computer system 30 need to communicate with computer system 37, for example, a signal from computer system 30 can be routed through switch 14 to switch 16 and on to computer system 37.

For reasons such as security or privacy, communication between VLANs may not be permitted. In LAN 10, access to a particular VLAN is controlled by the switches 11–16. For example, switch 16 can be configured to forward a message from computer system 30 (VLAN 1) to computer system 37 (VLAN 1) but to not forward a message from computer system 30 (VLAN 1) to computer system 36 (VLAN 2). In a similar manner, communication from a remote device can be controlled so that the remote device can only communicate with certain devices in LAN 10. Therefore, even though VLANs can share resources such as switches, VLANs can be prevented from sharing traffic and information.

Another advantage of VLANs is that the management and cabling of groups of devices are simplified, particularly when the allocation of resources within the LAN is changed. For instance, in the simplified example of Prior Art FIG. 1, VLAN 1 may be used by one organization and VLAN 2 by another. The first organization may need more resources, while the resources of the other organization may be underutilized. Accordingly, one of the computer systems in VLAN 2 can be reallocated to VLAN 1. Using VLANs, this can be accomplished without rewiring the LAN. Instead, this is accomplished by reconfiguring the appropriate switches.

In actual practice, a typical LAN will include large numbers of computer systems and switches (as well as other devices), with frequent changes to the allocation of these resources among the various VLANs. Each change may result in the reconfiguring of multiple switches. Typically, when a change is made, a human operator inputs/issues commands to reconfigure the affected switches. When done manually, this can be a tedious and time-consuming process that is also prone to human error.

Automated processes are becoming available to assist in the configuring of VLANs. However, these processes still have their shortcomings, particularly with regard to the verification of proper configuration of switches and therefore of VLANs. Some prior art techniques rely on manual procedures to verify correctness of the switch configurations. Typically, these procedures require logging into each switch, issuing commands to view their existing configurations, comparing those configurations to documentation of the desired (design) state, and then issuing commands to correct any discrepancies. Once the switches are reconfigured to correct any discrepancies, it may even be necessary to repeat the verification process. In general, manual verification is slow, costly and prone to human error.

Other prior art techniques essentially rely on the automated configuration process itself to ensure correct configuration of the switches and VLANs. For example, using information from a database, an automated procedure may exist for sending configuration commands to a switch. Such procedures may eliminate one source of human error, but they still have their shortcomings. Significantly, such procedures do not provide the capability to check that the switch configuration matches that of the database. Commands may go awry, may be misdirected to an incorrect switch, or may not be implemented as intended. Switches may malfunction during operation, perhaps losing some of their programming. A switch may be hacked with malicious intent, perhaps causing it to direct traffic to an unauthorized destination or to not forward traffic at all to certain destinations.

For these and other reasons, a method and/or system that can verify that switches and hence VLANs are properly configured would be of value. Embodiments of the present invention provide this and other advantages.

DISCLOSURE OF THE INVENTION

Embodiments of the present invention pertain to methods and systems for verifying that a virtual network is properly configured. In one embodiment, configuration information from devices in the virtual network is received. The configuration information is compared against reference information. The reference information represents the design of the virtual network. Discrepancies between the configuration of the devices and the design of the virtual network are identified.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Figure 1:
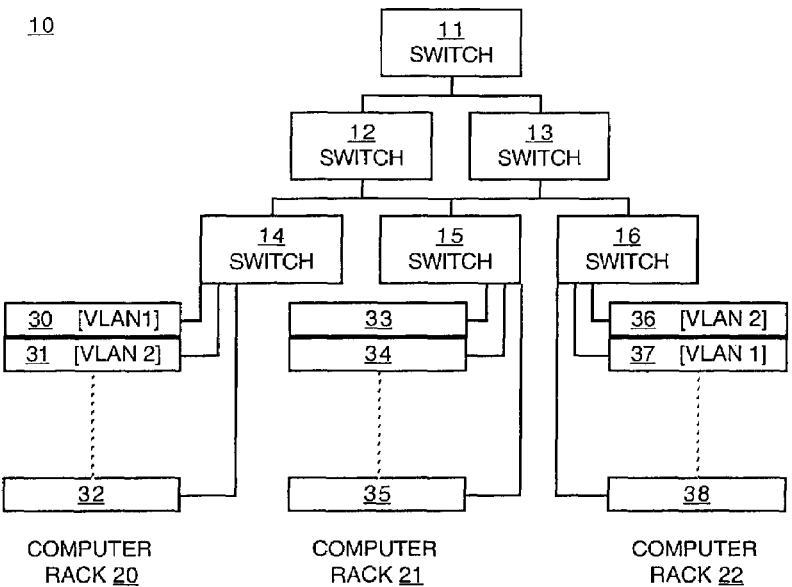
FIG. 1 is a block diagram of an exemplary local area network (LAN) including virtual local area networks (VLANs).
Figure 2:
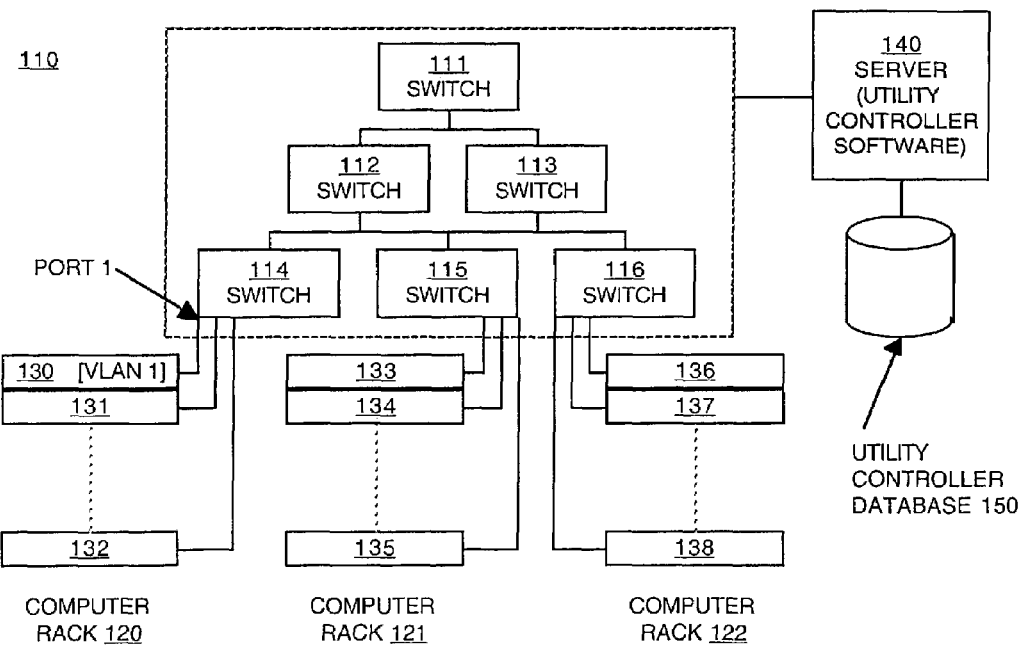
FIG. 2 is a block diagram of an exemplary LAN upon which embodiments of the present invention can be implemented.

FIG. 2 is a block diagram of an exemplary local area network (LAN) 110 upon which embodiments of the present invention can be implemented. It is appreciated that LAN 110 can include elements in addition to those shown (e.g., more racks, computers, switches and the like), and can also include other elements not shown or described herein. Furthermore, the blocks shown by FIG. 2 can be arranged differently than that illustrated, and can implement additional functions not described herein.

In general, LAN 110 utilizes a programmable infrastructure that enables the virtual connection of selected computing resources as well as the isolation of selected computing resources, thereby ensuring the security and segregation of computing resources at the lowest infrastructure level. The pool of computing resources in the LAN 110 includes pre-wired, pre-integrated, and pre-tested physical resources. The computing resources in the LAN 110 can be dynamically and logically reconfigured into various virtual local area networks (VLANs). A number of such VLANs can be created and managed by the utility controller software.

In the present embodiment, LAN 110 includes a number of switches 111 through 116, and a number of computers 130–138 that are couplable to the switches 111–116. Typically, the computers 130–138 are physically located in computer racks 120, 121 and 122, although this may not always be the case. In this embodiment, the switches and computer systems are interconnected using cables or the like. However, wireless connections between devices in LAN 110 are also contemplated.

In the present embodiment, the switches 111–116 can be programmed or configured such that LAN 110 is logically separated into a number of VLANs. The programming or configuring of these switches can be changed, thereby changing the resources allocated to the various VLANs. For example, by changing the configuration of switch 114, computer system 130 can be "moved" from one VLAN to another. The allocation and reallocation of resources between VLANs can be achieved without changing the physical wiring between devices.

In addition to computer systems and switches, LAN 110 can include other types of devices such as, but not limited to, routers, load balancers, firewalls, and hubs. These other types of devices may also be programmable or configurable. As will be seen, the features of the present invention can be used with these types of devices as well as with switches. That is, although described primarily in the context of switches, the features of the present invention are not so limited.

The term "configurable device" is used herein to refer to devices that can be programmed or configured. The term "configuration information" is used herein to refer to information that describes the configuration of a configurable device. If, for example, a configurable device is reallocated from one VLAN to another, its configuration information is updated to effect the change. In the present embodiment, the configuration information for a configurable device resides on the device, from which it can be read or retrieved. The actual configuration of a configurable device is also referred to herein as the "as-built" configuration of the device.

In the present embodiment, LAN 110 includes or is coupled to a server 140. Server 140 executes utility controller software for managing the resources in LAN 110, and as such server 140 can also be referred to as a utility controller. For example, the utility controller software executed by server 140 enables the deployment, allocation, and management of VLANs. The utility controller software monitors deployed VLANs, and automatically reallocates resources when there is a reason to do so.

In the present embodiment, server 140 includes a utility controller database 150; alternatively, utility controller database 150 can reside in a separate storage device that is coupled to the server 140. Utility controller database 150 includes information pertaining to the various resources in LAN 110. Importantly, utility controller database 150 includes information that is regarded as a correct and accurate representation of the LAN 110 as it is designed and as it should be implemented.

The utility controller database 150 is also referred to herein as "reference information," "design information," or "design basis information." As resources in LAN 110 are reallocated, the information in utility controller database 150 is also changed. Changes to the utility controller database 150 can also be used to drive changes to the allocation of resources in LAN 110. As will be seen, the present invention in its various embodiments verifies that the configuration or as-built information for each of the configurable devices in LAN 110 is correct relative to the reference or design information in utility controller database 150. In other words, embodiments of the present invention verify that the configurations of the configurable devices and the reference information in the utility controller database 150 are synchronized.

Utility controller database 150 includes information such as the types of devices in LAN 110 and a representation of each VLAN. Other information included in utility controller database 150 includes, but is not limited to: the network or MAC (media access control) address for the resources of LAN 110; the port numbers of the configurable devices; the VLAN identifiers associated with each of the port numbers; the socket identifier for each cable connected to each of the resources of LAN 110; manufacturer and model numbers; and serial numbers.

In one embodiment, utility controller database 150 is embodied as a computer-readable network map. It is understood that such a map need not exist in the form conventionally associated with human-readable maps. It is also appreciated that a computer-readable network map can be synthesized on-the-fly from the information stored in utility controller database 150.

Figure 3:
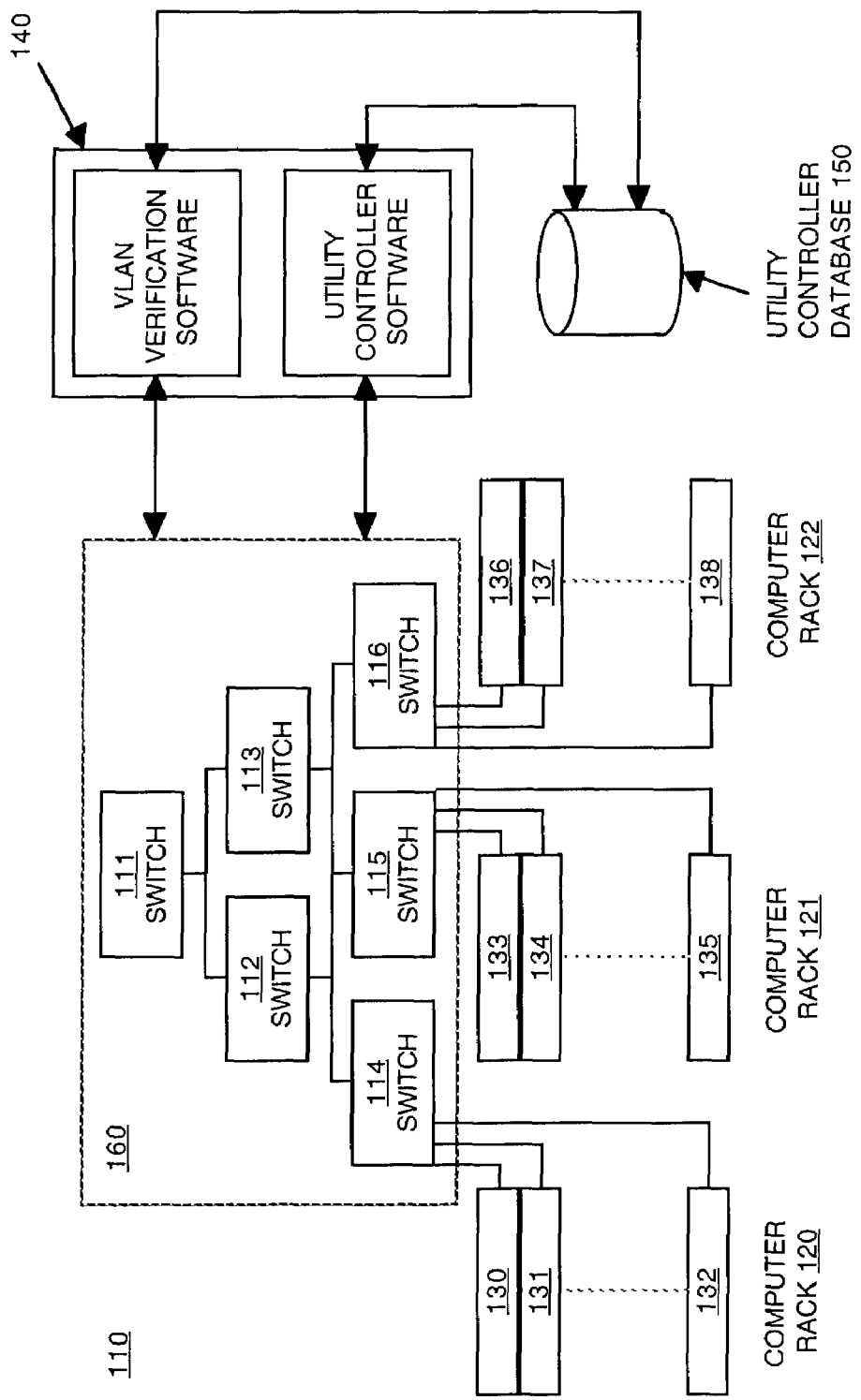
FIG. 3 is a block diagram of an exemplary LAN incorporating a VLAN verifier according to one embodiment of the present invention.

FIG. 3 is a block diagram of an exemplary LAN 110 incorporating a VLAN verifier according to one embodiment of the present invention. At least one of the functions of the VLAN verifier is to verify that the configuration or as-built information for each of the configurable devices in LAN 110 is correct relative to the reference or design information in utility controller database 150. Another function of the VLAN verifier is to identify corrective actions when a discrepancy between the configuration information and the reference information is identified. In one embodiment, these corrective actions are automatically implemented.

In the example of FIG. 3, the VLAN verifier is embodied as VLAN verification software residing on server 140. The VLAN verification software and the utility controller software can reside on the same or on different devices. The VLAN verification software and the utility controller software can also reside in the same or in different software packages or applications. What is of significance is that, in one embodiment, the VLAN verification software functions independently of the utility controller software, in order to provide independent verification of the configuration information.

In the present embodiment, the VLAN verifier (e.g., the VLAN verification software) is coupled to the utility controller database 150. As described above, utility controller database 150 includes reference or design information for LAN 110. The VLAN verifier is also coupled to the fabric 160 of configurable devices (e.g., switches 111–116). In general, the VLAN verifier has access to the configuration information for each of the switches 111–116. This can be accomplished by communicating with one of the switches that in turn communicates with each of the other switches, by directly communicating with each switch either in series or in parallel, or by some combination of these actions.

Figure 4:
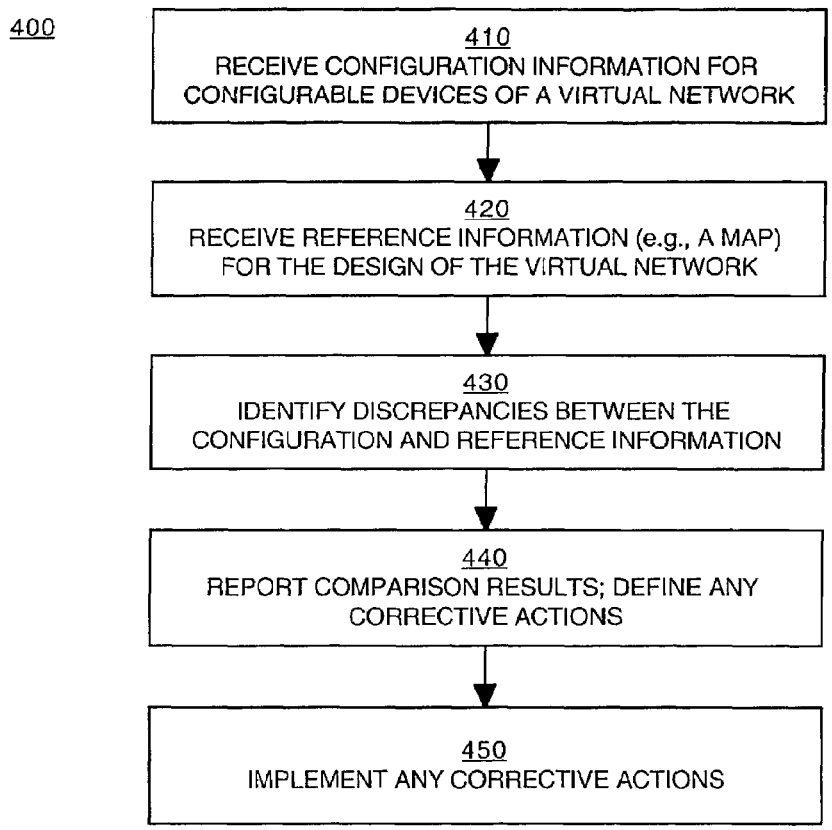
FIG. 4 is a flowchart of a process for verifying proper configuration of a VLAN according to one embodiment of the present invention.

FIG. 4 is a flowchart 400 of a process for verifying proper configuration of a VLAN according to one embodiment of the present invention. Although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed. All of, or a portion of, the methods described by flowchart 400 can be implemented using computer-readable and computer-executable instructions which reside, for example, in computer-usable media of a computer system or like device. In the present embodiment, flowchart 400 is implemented by the VLAN verification software residing on server 140 of FIG. 3.

Flowchart 400 of FIG. 4 is described for a single VLAN for simplicity of discussion. However, the following description can be readily extended to include all VLANs in a LAN. In addition, there may be times in which a configurable device is not allocated to a particular VLAN or is not in use. The following description can also be readily extended to include all configurable devices in a LAN, whether or not the device is a member of a VLAN or is in use.

In step 410, in the present embodiment, configuration information is received for each of the configurable devices in a virtual network. In one embodiment, the configuration information is received in response to a command issued to the configurable devices by, for example, the VLAN verifier (e.g., the VLAN verification software of FIG. 3). The command can request that the information be provided immediately in response to the command. Alternatively, the command can include information that establishes a schedule or deadline for providing the configuration information. Thus, configuration information is received by the VLAN verifier either in response to a command, or on a periodic basis regardless of whether another command is issued.

In another embodiment, the configuration information is provided to the VLAN verifier in response to some sort of triggering event. For example, if the configurable device experiences a change in its configuration information (e.g., the device is allocated to a different VLAN), then it can automatically provide its configuration information to the VLAN verifier. In yet another embodiment, the configuration information resident on each configurable device is accessed and read by the VLAN verifier. For example, instead of requesting the information and waiting for a response, the VLAN verifier accesses a known memory location on the configurable device and reads the configuration information that is stored there. Other methods for exchanging information between the configurable devices and the VLAN verification software can be used.

In step 420 of FIG. 4, reference information for the design of the VLAN is received by, for example, the VLAN verification software of FIG. 3. In one embodiment, this information resides in utility controller database 150 of FIG. 3. In another embodiment, the reference information includes a computer-readable map of the VLAN, perhaps derived from the information in utility controller database 150.

In step 430 of FIG. 4, the configuration information of step 410 is compared to the reference information of step 420. Any discrepancies between the configuration information and the reference information can be identified.

In step 440, the results of the comparison of step 430 are reported and any corrective actions are identified. The report and corrective actions can be of various forms, either human-readable or computer-readable or both. In one embodiment, if the configuration information and the reference information agree, then a report message is generated indicating that the as-built configuration of the VLAN is correct. A report message can optionally be generated for each instance of agreement between the configuration information and the reference information. In other words, a report message can be generated for each device in the VLAN, or even for the various elements of each device (e.g., for each port on each device).

In the present embodiment, a report message is also generated for each discrepancy between the configuration information and the reference information. This message can indicate that the as-built configuration of the VLAN is not correct, and can provide relevant information identifying the specifics of each discrepancy.

As mentioned, corrective actions can also be identified. In one embodiment, lines of text describing commands that can be used to bring the VLAN into compliance with the reference information are generated. Command lines specific to the various types of configurable devices present in the VLAN can be generated. In one embodiment, corrective actions can be implemented via electronically-transmitted commands by a program (e.g., by VLAN verification software 140 of FIG. 3).

In one embodiment, a human-readable report and/or a computer-readable report file are generated, summarizing the messages described above. In another embodiment, a human-readable set of commands and/or a computer-readable command file are generated. These commands include the corrective actions for bring the configuration information (and hence the as-built configuration of the VLAN) into compliance with the reference information in the utility controller database 150 (FIG. 3).

In step 450 of FIG. 4, the corrective actions are implemented. This step can take many forms, depending in part on the extent of the prior steps, and also depending on the degree of automation that is implemented. In one embodiment, in which human-readable reports and commands are generated, an administrator manually implements the corrective actions or a subset thereof (using the utility controller software of FIG. 3). For example, the administrator inputs some or all of the corrective action commands and gives permission for some or all of these commands to be executed. In another embodiment, in which the corrective actions are in computer-readable form, an administrator simply gives permission for some or all of the corrective action commands to be executed. In yet another embodiment, the utility controller software is given prior permission to implement any corrective actions and can do so without further human intervention.

The discussion above is based on the presumption that the reference information (e.g., utility controller database 150 of FIG. 3) is true and correct, and that any discrepancies between the reference and configuration information result in a change to the configuration information. Methods for ensuring the accuracy and completeness of the reference information are outside the scope of the present invention; however, such methods are known in the art. It is appreciated that embodiments of the present invention can be extended to the case in which the configuration information is known to be true and correct, and is used as the basis for updating the reference information. In other words, there can be instances in which discrepancies between the reference and configuration information result in a change to the reference information. Generally speaking, the VLAN verification software can be used to synchronize the configuration information and the reference information, with one source of information being used to drive a change to the other source of information, depending on which source of information is known to be correct.

Figure 5:
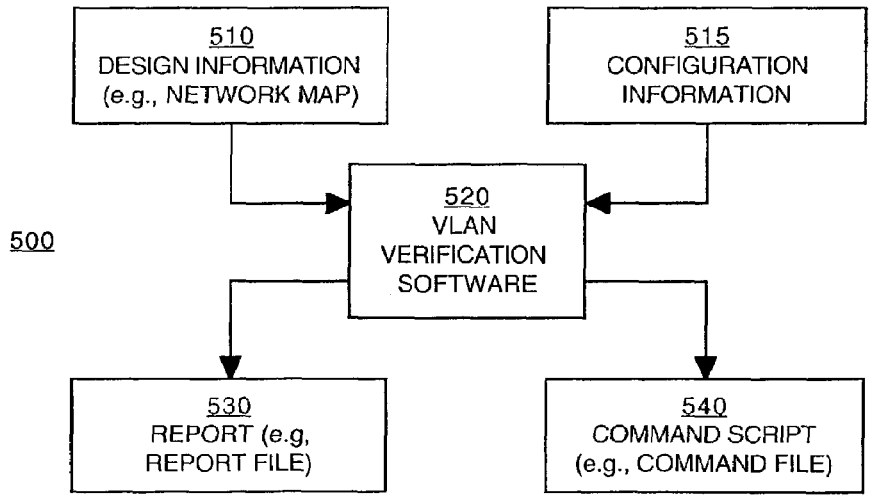
FIG. 5 is a data flow diagram for VLAN verification elements according to one embodiment of the present invention.

FIG. 5 is a data flow diagram 500 for VLAN verification elements according to one embodiment of the present invention. Although illustrated and described as separate elements, it is appreciated that any of these elements can be combined and/or integrated with any of the other elements.

In the embodiment of FIG. 5, the elements of the present invention include design (or reference) information 510, configuration information 515, VLAN verification software 520, a report 530, and command script 540. As described previously herein, the design information 510 includes a computer-readable version of a VLAN design; specifically, the version of a VLAN that is presumed to be correct and that is presumed to be implemented. The configuration information 515 includes computer-readable information that represents the VLAN as it actually is implemented. VLAN verification software 520 receives and compares the design information 510 and the configuration information 515 and generates a report 530. The report 530 includes a listing of any discrepancies between the design information 510 and the configuration information 515, and can also list instances of agreement between the design and configuration information. VLAN verification software 520 also generates any corrective actions that may be needed, including computer-generated command script that can be manually or automatically executed.

In summary, embodiments of the present invention provide methods and systems that can verify that configurable devices (e.g., switches) and hence VLANs are properly configured. By virtue of automation, correctness of the VLANs can be verified in less time, at less expense, and as often as desired. Each instance of an incorrect or otherwise unsatisfactory VLAN can be pinpointed quickly and early. Corrective actions are generated and readily implemented. Because these corrective actions can be computer-generated and, in some instances, automatically implemented, the risk of human error is reduced.

In addition to verifying correctness of the VLANs, embodiments of the present invention also facilitate improving the performance of the VLANs. For example, if VLAN performance is less than expected, the configuration of the VLAN can be quickly eliminated as a source of the problem, allowing administrators to focus on other possible sources of trouble.

As mentioned, the VLAN verification software and method thereof can be executed periodically or on demand. Accordingly, configurable devices can be checked for correctness even when a change in configuration information is not anticipated. In other words, a change in the configuration information of a configurable device due to a hardware malfunction, intervention by an unauthorized third party, or the like, would be detectable, even if the configurable device is not being used as part of a VLAN. In addition, configurable devices can be confidently replaced or removed from service (e.g., for maintenance), because the VLAN verification software provides assurance that the new hardware is properly configured.

Embodiments of the present invention are thus described. While the present invention has been described in particular embodiments, it should be appreciated that the present invention should not be construed as limited by such embodiments, but rather construed according to the following claims.

What is claimed is:

1. A method of verifying that a virtual network is properly configured, said method comprising:
   receiving configuration information from configurable devices included in said virtual network;
   comparing said configuration information against reference information representing a design of said virtual network;
   identifying discrepancies between said configuration information and said reference information;
   defining corrective actions for resolving the discrepancies; and
   generating computer-readable program code that resolves said discrepancies when executed.

2. The method of claim 1 wherein said reference information comprises a map of said virtual network.

3. The method of claim 1 further comprising: generating a report identifying said discrepancies.

4. The method of claim 1 further comprising:
   generating a report identifying instances in which said reference information and said configuration information are in agreement.

5. The method of claim 1 further comprising:
   automatically resolving said discrepancies in response to said identifying.

6. The method of claim 1 further comprising:
   sending a command to said configurable devices, wherein said configuration information is provided according to said command.

7. The method of claim 1 further comprising:
   reading said configuration information from storage resident on said configurable devices.

8. The method of claim 1 further comprising:
   validating a map of said virtual network from said configuration information.

9. The method of claim 1 wherein said configurable devices are selected from the group consisting of switches, routers, computers, load balancers, and firewalls.

10. The method of claim 1 wherein said configuration information comprises information that uniquely identifies each configurable device, information that identifies connections between configurable devices, and information that identifies which resources of said configurable device are associated with said virtual network.

11. A computer system for checking proper configuration of a virtual network comprising:
    a memory unit storing instructions for verifying the configuration of said virtual network; and
    a processor coupled to said memory unit, said processor for executing said instructions for verifying the configuration of said virtual network, said instructions for:
    processing configuration information provided by configurable devices included in said virtual network;
    evaluating said configuration information against reference information describing a design configuration of said virtual network;
    identifying differences between said configuration information and said reference information; and
    providing instructions for synchronizing said configuration information with said reference information.

12. The computer system of claim 11 wherein said reference information comprises a computer-readable version of a map of said virtual network.

13. The computer system of claim 11 wherein said method further comprises:
    producing a report listing said differences.

14. The computer system of claim 11 wherein said method further comprises:
    automatically reconfiguring said configurable devices according to said reference information to resolve said differences.

15. The computer system of claim 11 wherein said computer system is coupled to said configurable devices.

16. The computer system of claim 11 wherein said computer system is coupled to a source of said reference information.

17. A computer-readable recording medium having computer-readable program code embodied therein for causing a computer system to execute instructions for checking proper configuration of a virtual network, said program code comprising instructions for:
    accessing configuration information describing an as-built configuration of a device in said virtual network;
    accessing reference information describing a design configuration of said device;
    comparing said as-built configuration with said design configuration; and
    generating a message when there is a difference between said design configuration and said as-built configuration; and
    generating computer-readable instructions that synchronize said configuration information with said reference information.

18. The computer-readable recording medium of claim 17 wherein said computer-readable program code comprises instructions for:
    generating command script for making said as-built configuration compliant with said design configuration.

19. The computer-readable recording medium of claim 18 wherein said computer-readable program code comprises instructions for:
    executing said command script, causing said device to be reconfigured according to said design configuration.

20. The computer-readable recording medium of claim 19 wherein said command script is executed automatically without user intervention.

21. The computer-readable recording medium of claim 17 wherein said information describing said as-built configuration is derived from a computer-readable map of said virtual network.

22. The computer-readable recording medium of claim 17 wherein said computer-readable program code comprises instructions for:
    generating a message indicating said virtual network is properly configured.

* * * * *

UNITED STATES PATENT AND TRADEMARK OFFICE
CERTIFICATE OF CORRECTION

PATENT NO.        : 7,184,942 B2                          Page 1 of 1
APPLICATION NO.   : 10/444453
DATED             : February 27, 2007
INVENTOR(S)       : David Andrew Graves et al.

It is certified that error appears in the above-identified patent and that said Letters Patent is hereby corrected as shown below:

In column 10, line 28, in Claim 17, after "configuration;" delete "and".

In column 10, line 33, in Claim 17, delete "computer-readable" and insert -- computer-executable --, therefor.

Signed and Sealed this

Second Day of February, 2010

David J. Kappos
*Director of the United States Patent and Trademark Office*